Patented June 17, 1941

2,245,708

UNITED STATES PATENT OFFICE 2,245,708

COATING PROCESS

Carl W. Patton, Pittsburgh, Pa., assignor to Carbide and Carbon Chemicals Corporation, a corporation of New York No Drawing. Application March 9, 1938,
Serial No. 194,765

6 Claims. (Cl. 91—70)

The artificial resin which results from the conjoint polymerization of vinyl halides, such as vinyl chloride, with vinyl esters of the lower aliphatic acids, for instance vinyl acetate, is a substance of unique properties. These properties are dependent on a plurality of interrelated factors. Some of these factors are: the relative proportions of high and low polymers in the resin, the average degree of polymerization of the resin, the molecular structure of the resin, and the percentage of vinyl halide present. Therefore, much ingenuity is required to adapt this resin for certain purposes in the arts.

The resin is thermoplastic in nature. It is characterized by good mechanical strength, excellent adhesion to various surfaces, and compatibility with many pigments, plasticizers, and other modifying agents. It is also clear and colorless, odorless, tasteless, non-toxic, and chemically and physically inert to a surprising degree. It is highly resistant to water, alkalis, acids, salt solutions, and to most of the common organic solvents. It is insoluble at ordinary temperatures, for instance, in alcohols, in aliphatic hydrocarbons, in most aromatic hydrocarbons, in ethers, in glycols, and in many amines and hydroxyalkyl amines. Such properties admirably adapt this resin for use as a protective and decorative coating for many articles.

At elevated temperatures these resins become increasingly soluble in the known solvents for them, and the possibility of using this fact in the formation of coating solutions is thus suggested. However, experience has taught that the resin might be expected either to coagulate in threads (or to "cob-web," so-called) when released from the heated solution as in spraying, or to penetrate unduly into porous surfaces to which it is applied. Moreover, it is known that in the presence of liquids of insufficient dissolving power, or of insufficient quantity for solution, at ordinary temperatures these resins form swollen, tacky, non-homogeneous masses of no practical utility, and it was accordingly expected that such would be the state to which the mass would revert regardless of its condition when heated.

Thus, in those instances where it was desired to use liquid coating compositions, the utility of this resin has been restricted by its relative insolubility. It is readily soluble only in very few solvents, for example, in ketones, in certain esters and chlorinated hydrocarbons, and in certain arocyclic dialkylene dioxides. Of these, only the ketones, such as methyl ethyl ketone, methyl n-amyl ketone, methyl isobutyl ketone, methyl cyclohexanone, and acetonyl acetone, fulfill present requirements for a solvent suitable for practical purposes in coating compositions. Unfortunately, the ketone solvents, with the exception of acetone, are relatively expensive. Acetone is of limited suitability because of its high volatility and water-miscibility. Heretofore, the art has been required to use the expensive ketone solvents for this resin, and thus, for economic reasons, the fullest use of the desirable properties of this resin has been prevented.

The chief object of my invention is to provide an economical method for coating articles with a liquid composition containing a resin of the kind resulting from the conjoint polymerization of vinyl halides with vinyl esters of the lower aliphatic acids. A further object is to control the penetration of the resin composition into porous and fibrous materials when coated with such compositions.

I have discovered that the resins discussed may be dissolved at elevated temperatures in certain liquid compositions which, at ordinary temperatures (i. e. below about 40° C.), do not dissolve the resin. Not only is the resin not dissolved by these compositions at ordinary temperatures, but it is swollen and extended into non-homogeneous, tacky masses which are totally unsuited for coating materials. By solution, I do not mean necessarily a true solution, such as results when sugar or salt is dissolved in water, but I wish to use the term as it is customarily employed in the arts pertaining to resins and the like to mean a uniform colloidal dispersion of solvated resin molecules in the solvent. The hot coating composition is applied to the surface to be covered, whereupon rapid cooling occurs and, upon evaporation of the volatile liquids, the resin is precipitated (or coagulated) to form a continuous coating. The resin, however, is not deposited as the tacky, non-homogeneous, swollen mass which results when the resin and the liquid composition are brought together at ordinary temperatures, but it is in the form of a clear, homogeneous film of good mechanical strength. This effect is truly remarkable.

More specifically, the resin is dissolved at temperatures above about 60° C. and below about 125° C. in a liquid composition which does not dissolve the resin at ordinary temperatures. I prefer to use in my liquid composition such aromatic hydrocarbons as benzene, toluene, xylene, tetrahydronaphthalene, and the solvent naphthas of high flash point. A small amount of active solvent, such as a ketone of the group already discussed, should be included to insure the homogeneity of the film formed from the hot solution. The boiling point range of the components of the liquid composition is governed by the coating thickness desired. For ordinary uses, it should preferably be between about 90° and about 125° C. If coatings thicker than 0.001 inch are to be produced, it may be desirable to employ liquids boiling below 100° C. in order to facilitate removal of the liquid from the film. In such cases, the temperature of the coating composition should also be correspondingly lowered. If liquids are used in the composition at temperatures above their boiling points, imperfections in the coating are apt to result from the excessive evolution of the liquid vapors.

If an extremely thin, varnish-like coating is to be applied, higher boiling liquids which are solvents for the resin at elevated temperatures, but non-solvents for the resin at ordinary temperatures may be used. Examples of these are the monobenzyl ether of ethylene glycol, the monophenyl ether of ethylene glycol, the monobutyl ether of diethylene glycol, and diacetone alcohol.

Plasticizers may be used to soften the resin in these coating compositions. Examples of suitable softening agents are dibutyl phthalate, tricresyl phosphate, di(beta-butoxyethyl) phthalate, methyl phthalyl ethyl glycollate, and dibutyl sebacate. Such softening agents are also helpful in maintaining the homogeneity of the film formed from the hot solution. If sufficient softening agent is present, the small amount of ketone solvent referred to may be entirely omitted. The term "active solvent" as used in the appended claims will be understood to include active solvents such as the group of ketones previously discussed, as well as softening agents or plasticizers.

The resin preferred for use in the practice of this invention is that resulting from the conjoint polymerization of vinyl chloride with vinyl acetate which contains from about 70% to about 95%, and most desirably from about 85% to about 90%, by weight of vinyl chloride in the polymer and which has an average molecular weight of from about 5,000 to about 20,000. (The molecular weights are estimated from the specific viscosity of dilute solutions according to Staudinger's method.) Because of its high vinyl chloride content, it is substantially insoluble in toluene and other aromatic hydrocarbons at ordinary temperatures. These resins and their preparation form no part of this invention since they are well known in the art.

The use of a hot solution containing this conjointly polymerized resin for coating articles constitutes a distinct advance over prior methods. In the first place, even if the same ketone solvents were required, at the higher coating temperatures more resin may be dissolved in a given amount of solvent without increasing the viscosity of the solution beyond desirable and useful limits. This results in solvent economy. However, it has been discovered that at higher temperatures the aromatic hydrocarbons may replace substantially all of the ketone solvents heretofore required. Since the cost of many liquid aromatic hydrocarbons is only a fraction of the cost of the ketone solvents, this invention enables the art to make fuller use of the valuable properties of this artificial resin.

Various methods of applying the hot solution described above may be used. Using a suitable spraying equipment containing a heating device, it may be sprayed onto the article. The spraying procedure is well adapted to the coating of porous materials. Whereas previously, in the spray coating of porous materials, considerable impregnation of the material resulted, this new process permits the film to be formed almost entirely on the surface. This ensues from the rapid decrease in fluidity when the hot solution comes in contact with the cooler surface of the material being coated. Extensive penetration of the liquid into the pores of the surface is effectively prevented by this increase in viscosity of the solution.

The same effect may be achieved even when other methods of coating the article are employed. For instance, if the hot solution be applied by knife-coating at high speeds so that there is a very limited time of contact with the surface being coated, very slight penetration of the porous surface will occur. On certain porous papers this results in considerable saving in the amount of resin required to form a protective film.

Paper and other materials of a more dense surface may, of course, be coated with a hot solution containing this resin. In this instance, some impregnation of the surface may be desirable in order to secure firm adhesion of the resin film. This result may be obtained by knife-coating the material at slow speeds, or by maintaining the material being coated at a temperature approximately that of the solution being applied. The above advantages may also be obtained by employing exclusively the active ketone solvents in the composition.

The solvating liquids are removed from the coated material by evaporation as in the usual process, but, because the coating composition is hot when applied, drying is greatly facilitated. Forced drying by various known means may also be employed.

I have also found that when the resin is treated at a temperature of about 95° C. with the liquid compositions referred to in amounts insufficient to dissolve the resin and to form a completely fluid composition even at the elevated temperature, the resulting composition is sufficiently plastic and mobile to be used for coating purposes. Homogeneous films of good mechanical strength can be formed even under these conditions.

Since this resin is thermoplastic, it may be converted to a state approaching sufficient plasticity for coating articles by merely heating it to a temperature of around 145° C. However, at this temperature, the resin has a very limited chemical stability and great care must be taken to prevent the darkening or decomposition of the plastic mass. My invention permits the resinous coating to be applied at a temperature range in which the resin has a chemically stable period very many times greater than at 145° C. Consequently, no particular precautions need be taken to prevent darkening of the plastic mass during the coating operation. If the composition is maintained at an elevated temperature for a protracted period, heat stabilizers in an amount of about 1% by weight of the resin present should be used. Satisfactory heat stabilizers are basic compounds or metal soaps, such as lead or calcium stearates.

The following examples will serve more fully to illustrate my invention:

Example I

A resinous mixture of the following composition was prepared:

| | Parts by weight |
|---|---|
| Resin—viscosity about 15 | 25 |
| Resin—viscosity about 110 | 45 |
| Methyl phthalyl ethyl glycollate | 30 |
| Methyl isobutyl ketone | 10 |
| Toluene | 90 |

The resin was one resulting from the conjoint polymerization of vinyl chloride with vinyl acetate containing 85% to 88% by weight of vinyl chloride in the polymer. The viscosities are given in centipoises determined at 20° C. on an 18% by weight dispersion of the resin in methyl isobutyl ketone. These viscosities designate fractions of the resin of differing average molecular weights and differing ranges of molecular weights and degrees of polymerization. Thus, the resin of viscosity 15 had a molecular weight range of about 1000 to about 16,000, and an average molecular weight of about 5,000, while the resin of viscosity 110 ranged in molecular weight from about 2,000 to about 18,000 and had an average molecular weight of about 11,000.

At ordinary temperatures, this mixture was a non-cohesive, non-homogeneous mass. When heated with agitation to a temperature of 93° C., the resin dissolved to form a uniform dispersion of high fluidity. The composition was sprayed on a porous paper at this temperature from a jet-impingement nozzle having an orifice of 0.035 inch. Compressed nitrogen was used to supply the necessary pressure. The spraying equipment was fitted with hot water and steam jackets to maintain the desired high temperatures.

Contrary to expectations, there was practically no tendency for the hot atomized solution, when ejected into the air, to coagulate as filaments. The paper was uniformly coated with a smooth continuous surface film of resin. Substantially no penetration of the paper resulted and firm adhesion of the film to the paper was obtained.

Example II

A resinous mixture of the following composition was prepared:

| | Parts by weight |
|---|---|
| Resin—viscosity about 15 | 20 |
| Resin—viscosity about 110 | 60 |
| Tricresyl phosphate | 20 |
| Toluene | 150 |

The resins used were those described in Example I.

The mixture was heated to a temperature of about 90° to about 95° C., at which temperature the resin was soluble in the liquid.

At this temperature the hot solution was knife-coated on papers of the glassine and parchment type. The equipment used was of standard type. It was found that the degree of impregnation of the parchment paper could be regulated by controlling the length of time the hot solution was kept in contact with the paper.

Good adhesion of the resin film to the parchment paper was secured. The coated product was of good appearance and of satisfactory flexibility. It is useful wherever a paper resistant to moisture, grease, and other deteriorating influences is required.

Example III

A resinous mixture of the following composition was prepared using an amount of liquid insufficient to form a mobile and completely fluid solution with the resin even at elevated temperatures:

| | Parts by weight |
|---|---|
| Resin—viscosity about 110 | 46 |
| Tricresyl phosphate | 23 |
| Toluene | 31 |

The resin was that described in Example I.

The mixture progressively softened during heating until at 90° C. it was extremely plastic. At this temperature the mixture was employed as a coating for various surfaces. On cooling to the original temperature of the mixture, it was found that the resin had formed itself into clear films of good mechanical strength. This was in sharp contradistinction to the state of the mixture before heating.

It is to be understood that the specific compositions disclosed above are solely exemplary, and many modifications will be readily apparent, and are included within the invention as defined by the appended claims.

I claim:

1. Process of coating articles which comprises applying to their surface a homogeneous fluid dispersion of a vinyl resin in an essentially volatile organic liquid composition maintained at an elevated temperature, said liquid composition being composed of a mixture of an active solvent for the vinyl resin and an organic liquid of the group of volatile aromatic hydrocarbons, ethylene glycol monobenzyl and monobutyl ethers, diethylene glycol monobutyl ether and diacetone alcohol, which mixture is incapable of forming homogeneous fluid dispersions with said vinyl resin at ordinary temperatures but capable of forming such dispersions at said elevated temperature, and thereafter removing the volatile portion of said organic liquid composition from the applied dispersion and depositing on said surface an essentially homogeneous, strong and flexible resinous film of said vinyl resin, the vinyl resin being substantially identical with one resulting from the conjoint polymerization of a vinyl halide with a vinyl ester of an aliphatic acid containing from about 70% to about 95% by weight of the vinyl halide.

2. Process of coating articles which comprises applying to their surface a homogeneous fluid dispersion of a vinyl resin in an essentially volatile organic liquid composition, composed of an active solvent for said vinyl resin and a volatile aromatic hydrocarbon, maintained at an elevated temperature, said liquid composition being incapable of forming homogeneous fluid dispersions with said vinyl resin at ordinary temperatures but capable of forming such dispersions at said elevated temperature, and thereafter removing the volatile portion of said organic liquid composition from the applied dispersion and depositing on said surface an essentially homogeneous, strong and flexible resinous film of said vinyl resin, the vinyl resin being substantially identical with one resulting from the conjoint polymerization of vinyl chloride with vinyl acetate containing from about 70% to about 95% by weight of vinyl chloride.

3. Process of coating articles which comprises applying to their surface a homogeneous fluid dispersion of a vinyl resin in an essentially volatile organic liquid composition, composed of an active solvent for said vinyl resin and a volatile aromatic hydrocarbon, maintained at an elevated temperature of 60° C. to about 125° C., said liquid composition being incapable of forming homogeneous fluid dispersions with said vinyl resin at ordinary temperatures but capable of forming such dispersions at said elevated temperature, and thereafter removing the volatile portion of said organic liquid composition from the applied dispersion and depositing on said surface an essentially homogeneous, strong and flexible resinous film of said vinyl resin, the vinyl resin being substantially identical with one resulting from the conjoint polymerization of vinyl chloride with vinyl acetate containing from about 70% to about 95% by weight of vinyl chloride.

4. Method of limiting and controlling the impregnation of articles having a porous surface by vinyl resin coating compositions, which comprises applying to said surface a homogeneous fluid dispersion of a vinyl resin in an essentially volatile organic liquid composition maintained at an elevated temperature above said surface, said liquid composition being composed of a mixture of an active solvent for the vinyl resin and an organic liquid of the group of volatile aromatic hydrocarbons, ethylene glycol monobenzyl and monobutyl ethers, diethylene glycol monobutyl ether and diacetone alcohol, which mixture is incapable of forming homogeneous fluid dispersions with said vinyl resin at ordinary temperatures but capable of forming such dispersions at said elevated temperature, and thereafter rapidly cooling the dispersion and removing the volatile portion of said organic liquid composition whereby there is deposited substantially on the surface of said article an essentially homogeneous, strong and flexible resinous film of said vinyl resin, the vinyl resin being substantially identical with one resulting from the conjoint polymerization of vinyl chloride with a vinyl ester of an aliphatic acid containing from about 70% to about 95% by weight of vinyl chloride.

5. Method of limiting and controlling the impregnation of articles having a porous surface by vinyl resin coating compositions, which comprises applying to said surface a homogeneous fluid dispersion of a vinyl resin in an essentially volatile organic liquid composition, composed of an active solvent for said vinyl resin and a volatile aromatic hydrocarbon, maintained at a temperature of 60° C. to about 125° C., said liquid composition being incapable of forming homogeneous fluid dispersions with said vinyl resin at ordinary temperatures but capable of forming such dispersions at said elevated temperature, and thereafter rapidly cooling the dispersion and removing the volatile portion of said organic liquid composition whereby there is deposited substantially on the surface of said article an essentially homogeneous, strong and flexible resinous film of said vinyl resin, the vinyl resin being substantially identical with one resulting from the conjoint polymerization of vinyl chloride with a vinyl ester of an aliphatic acid containing from about 70% to about 95% by weight of vinyl chloride.

6. Method of limiting and controlling the impregnation of articles having a porous surface by vinyl resin coating compositions, which comprises applying to said surface a homogeneous fluid dispersion of a vinyl resin in an essentially volatile organic liquid composition, composed of a ketone solvent and toluene, maintained at a temperature of 60° C. to about 125° C., said liquid composition being incapable of forming homogeneous fluid dispersions with said vinyl resin at ordinary temperatures but capable of forming such dispersions at said elevated temperature, and thereafter rapidly cooling the dispersion and removing the volatile portion of said organic liquid composition whereby there is deposited substantially on the surface of said article an essentially homogeneous, strong and flexible resinous film of said vinyl resin, the vinyl resin being substantially identical with one resulting from the conjoint polymerization of vinyl chloride with vinyl acetate containing from about 70% to about 95% by weight of vinyl chloride.

CARL W. PATTON.